Dec. 12, 1961   A. C. PAWELA   3,012,615
DEBANKER
Filed Oct. 2, 1959   4 Sheets-Sheet 1

Inventor
Albert C. Pawela
By
Attorney

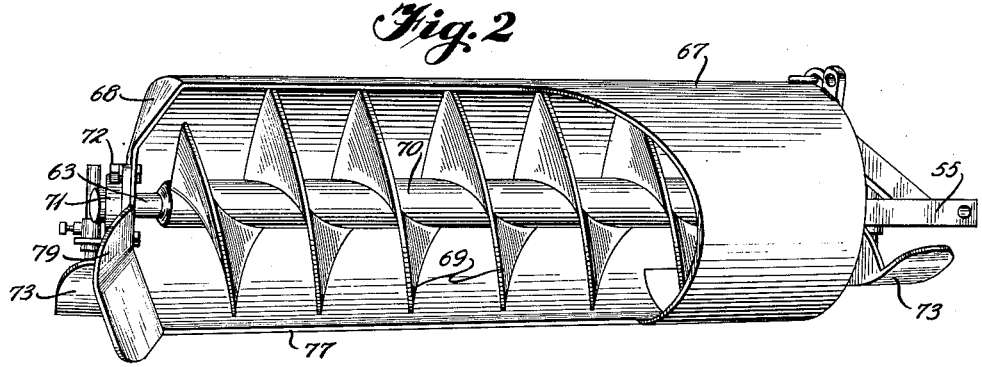
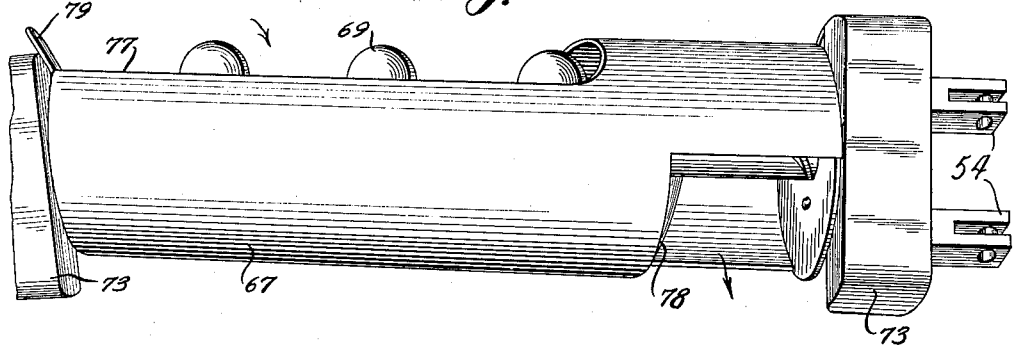
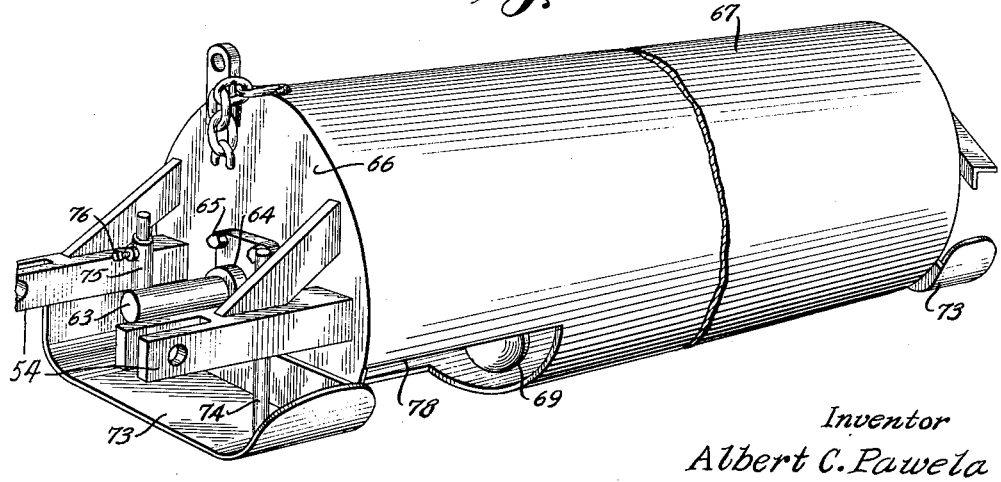

Dec. 12, 1961

A. C. PAWELA 3,012,615

DEBANKER

Filed Oct. 2, 1959

4 Sheets-Sheet 3

Inventor
Albert C. Pawela

By
Ayates Dowell.
Attorney

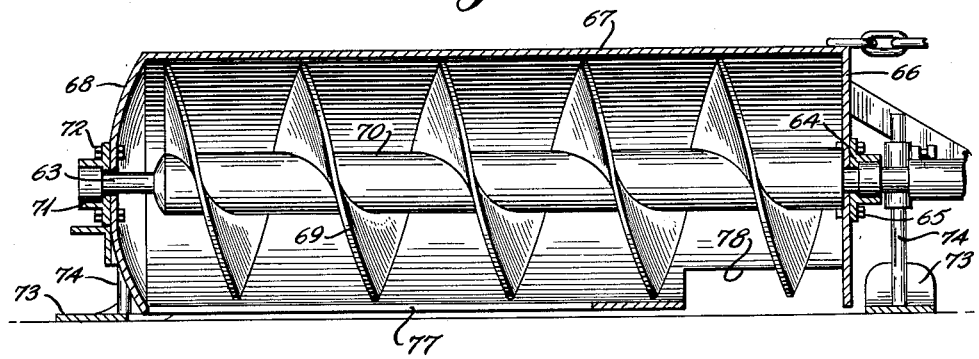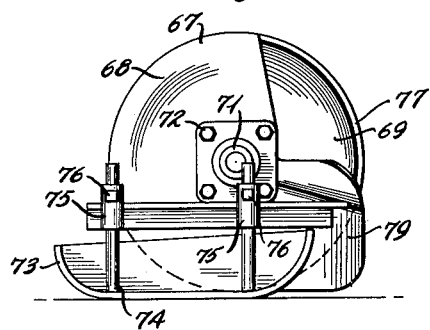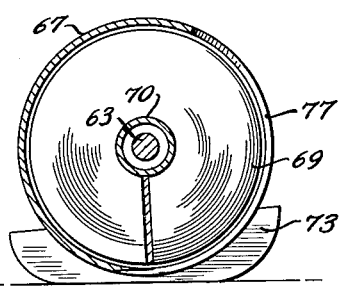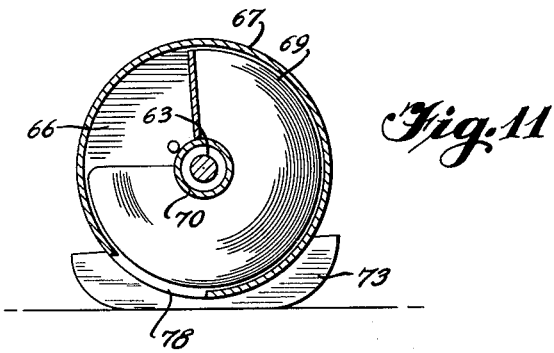

3,012,615
DEBANKER
Albert C. Pawela, Eustis, Fla., assignor of one-half to Dillard Tractor Company, Inc., Eustis, Fla.
Filed Oct. 2, 1959, Ser. No. 843,963
3 Claims. (Cl. 172—78)

This invention relates to the cultivation of the soil and the movement of the earth in connection with plant life and to the equipment employed including that for removing a bank of earth from around trees or the like put there to protect them in severe weather from the elements and which it is desired to remove to permit their growth.

The invention relates particularly to cultivators, fertilizer distributors, bankers or hillers, debankers, ringers and the like employed in the care and cultivation of plant life and especially for removing the bank of earth from around a plant with a minimum of effort and a minimum of time.

Cultivators or hoes have been produced of various devices including those mounted on tractors having laterally extending portions adapted to be raised and lowered and driven from a tractor and these have been used to provide a bank of earth around a plant for the protection of the plant from the elements during severe weather. The provision of a bank has been one of the requirements of insurance companies but which has not been easy to accomplish with machines already in existence due to size, limited maneuverability and for other reasons and also the removal of the bank has been difficult for similar reasons. Further, in providing a bank or in removing the same the roots of the plant have been disturbed interfering with the growth of the plant.

It is an object of the invention to provide a device for debanking or removing earth from around a tree or plant and which device can be selectively used in association with a tractor to remove the bank of earth from around the plant and to return the earth to the place from which it came.

Another object of the invention is to provide a device for removing a bank of earth which device includes a screw which can be employed for removing a bank and for discharging the earth removed in a ring around the plant without interfering with the roots of the plant and to permit further cultivation.

A further object of the invention is to provide a device for removing a bank of earth from around a plant which device is mounted on a tractor and subject to the controls by the operator of the tractor.

Figures 1, 12:
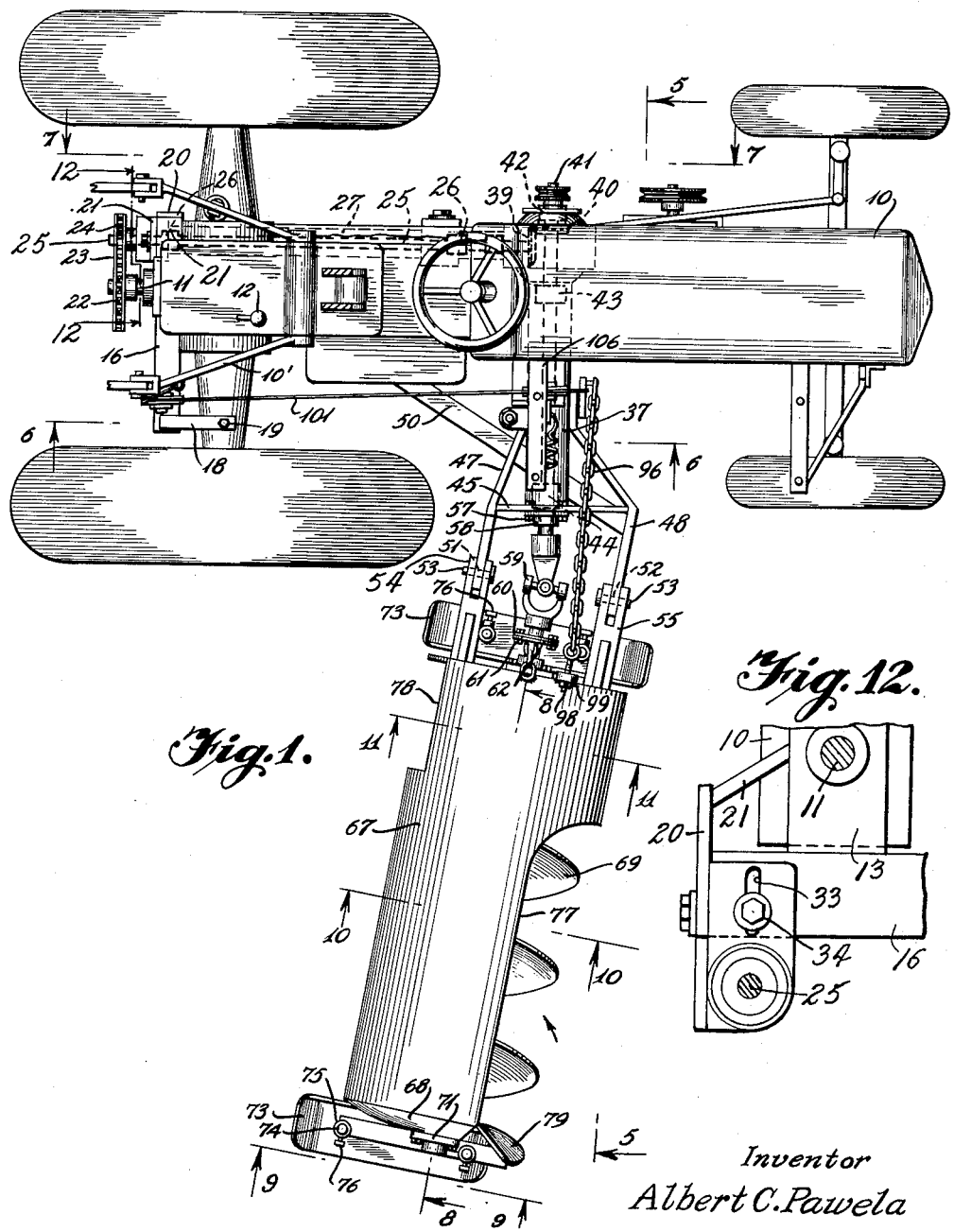
Figure 5:
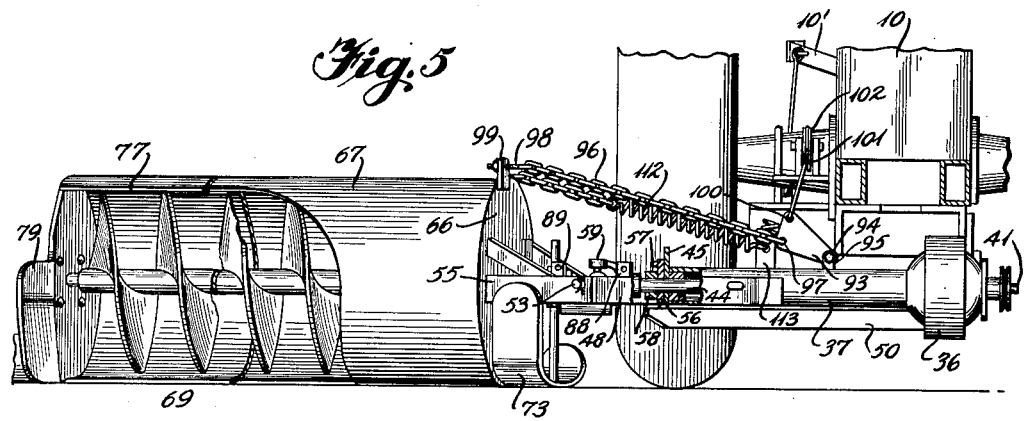
Figure 6:
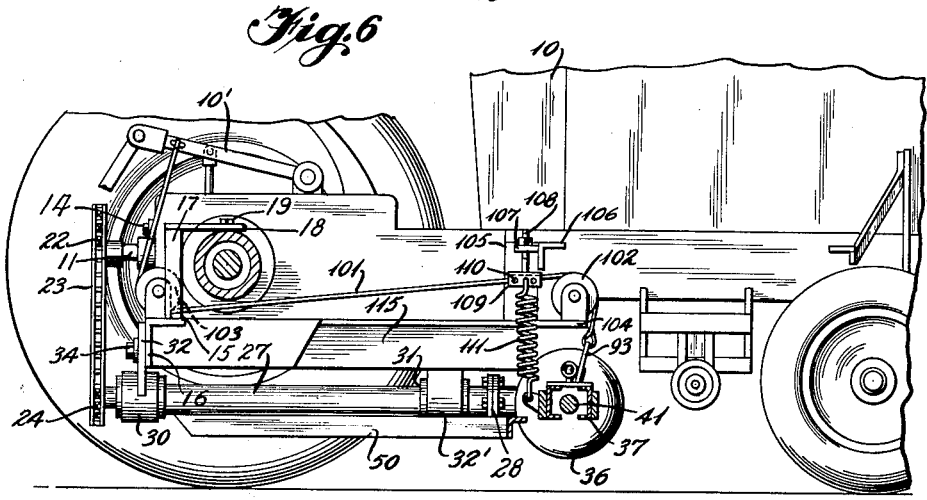
Figure 7:
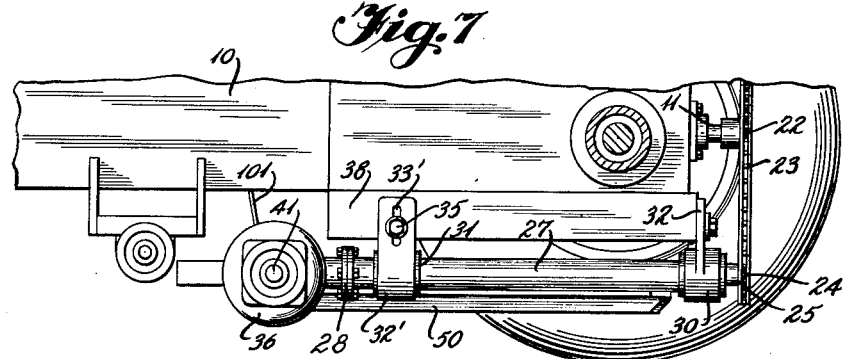

Other objects and advantages of the invention will become apparent from the following description taken in conjunction with the accompanying drawings wherein:

FIG. 1 is a top plan illustrating one application of the invention;

FIG. 2, a front perspective of the debanker;

FIG. 3, a bottom perspective thereof;

FIG. 4, a perspective of the attaching end;

FIG. 5, a front elevation illustrating the device applied to a tractor;

FIG. 6, a section on the line 6—6 of FIG. 1;

FIG. 7, a section on the line 7—7 of FIG. 1;

FIG. 8, a section on the line 8—8 of FIG. 1; and

FIGS. 9, 10 and 11, sections on the lines 9—9, 10—10 and 11—11 of FIG. 1.

FIG. 12 is a rear elevation, partly in section, of certain details.

Briefly stated the debanker of the present invention is a device which can be attached to a tractor for removing a ring or bank of earth from around a plant or tree and such device comprises a generally cylindrical housing containing a screw conveyor and having an opening along a substantial portion of the front of the housing so that the screw can come in contact with a bank of earth to be removed and with a discharge opening at the rear through which the earth which has been removed by the screw can be deposited. The power to operate the debanker is supplied from the power takeoff of the tractor through a shear coupling and universal joint into the screw and the debanker housing is supported on mounting mechanism to which it is pivoted and which mounting mechanism can be raised or lowered relative to the tractor.

With continued reference to the drawings, a tractor 10, of conventional construction, has a power drive including a shaft 11 extending from its rear and from which shaft various devices may be driven. The operation of the shaft 11 is controlled through a clutch of known construction by a lever 12.

An upright plate or arm 13 is mounted about the end of the power takeoff by bolts 14, and to the lower end of such plate is attached a horizontal plate or shelf member 15 which supports a transverse angle bar 16 to the end of which adjacent the right hand side of the tractor is attached an upright post 17 topped with a horizontal plate or cap 18, secured by a bolt 19 to the tractor rear axle housing adjacent the wheel at the right hand side thereof. Reference is made to my Patent No. 2,974,616, granted March 14, 1961, for a further disclosure of these and other details of the tractor and its power take-off.

The opposite or left hand end of the angle bar 16 is provided with a mounting plate 20 across the end thereof in vertical position to the angle bar 16, such plate being welded to the end of the angle bar and having an angular bracket 21 connecting the upper rear corner of the same with the upper side edge of the plate 13 to increase the rigidity of the structure.

On the power takeoff shaft 11 is mounted a sprocket 22 having a known taper lock hub, which sprocket drives through a chain 23 a smaller sprocket 24 fixed to the rear end of a forwardly extending drive shaft 25. The drive shaft 25 is supported by spaced bearings 26 and is contained within a housing 27 with a coupling 28 for assembly purposes, such drive shaft housing 27 corresponding to that of a conventional automobile drive shaft housing and being pivotally supported within a pair of spaced bearing sleeves 30 and 31 near the rear and forward ends of the housing. The sleeve 30 is attached to an upright plate 32 having a slot 33 therein for receiving a bolt 34 and such plate is located at the rear end of the housing which extends through the mounting plate 20 at the end of the angular bracket 21. The sleeve 31 is mounted on a plate 32' having a slot 33' therein for receiving a bolt 35 at the forward end of the drive shaft housing and the plate 32' is adjustably mounted on a bracket 38 attached to the tractor. The two bolts 34 and 35 can be loosened to vary the elevation and angularity of the drive shaft housing. The forward end of the drive shaft housing is connected to a gearbox or housing 36, which in turn is connected to a shaft housing 37 extending at right angles to the housing 27.

The drive shaft 25 carries a bevel gear 39 within the housing 36 and such bevel gear engages a cooperating bevel gear 40 on a shaft 41 within the housing 36 and carried by spaced bearings 42 and 43 on opposite sides of the housing 36.

The opposite end of the shaft 41, at the right hand side of the vehicle, is mounted in a bearing 44 carried by a cross plate 45 welded to the housing 37. The plate 45 has short and long ends, the short end being attached to a shorter side bar 47 and the long end being connected to a longer side bar 48, such side bars having rear ends converging to contact the housing 37 and being secured thereto by welds 49.

An angular supplemental brace 50, which may be L-shape in cross-section for strength, is welded or otherwise secured to the bar 48 adjacent to the junction of the same with the plate 45 and to the bar 47 near the rear or end of the same adjacent the housing 37. The opposite end of the brace 50 is welded or otherwise secured to the drive shaft housing so that it and the housing 37 with the shaft 41 and the brace 50 as a unit can be moved about the axis of the drive shaft 25.

The forward ends of the bars 47 and 48 are provided with pivotal openings 51 and 52 (FIG. 1) for the reception of pivots 53 to support a debanker or other operating unit having bifurcated ends 54 and 55. The debanker or operating unit is driven from the shaft 41 supported by the bearing 44 and by bearing 56 fastened by bolts 57 to the crossplate 45. The bearing 56 has a set collar 58 to fasten the bearing to the shaft so that the bearing will be retained in its mounting. The shaft 41 is connected to the operating unit by the universal joint 59 and the shear coupling plate 60 welded thereto and adapted to be attached by pins or bolts 61 to a cooperating shear coupling plate 62 mounted on the operating unit or implement shaft 63. The implement shaft 63 is mounted in end bearings 64 fastened by bolts 65 to the front flat end 66 of a generally cylindrical housing 67 having a rear curved end 68 at the opposite end. The generally cylindrical housing 67 is provided with a screw 69 which is welded to a double strength tube or pipe 70. The screw has convolutions of such a hand and is rotated by the power take-off of the tractor in such a direction as to move the earth axially through the debanker toward the tractor. The shaft 63 is received within and welded to the double strength tube 70 so that there is a small space between the tube and the shaft to prevent warping of the shaft when the tube is subjected to welding heat. The outer end of the shaft 63 is journaled in bearings 71 fastened to the end plate 68 by means of bolts 72. The shaft 63 is driven from the power takeoff through the universal joint and the shear coupling. The housing is adapted to follow the contour of the earth because of the pivotal connections at 30, 31 and 53 and in order to control the elevation of the ends of the same, skids 73 are provided one at each end of the housing carrying spaced posts 74 adjustable in spaced sleeves 75 welded to the arms 54, 55. The sleeves 75 are provided with set screws 76 for securing the posts within the sleeves in the proper adjusted position.

The housing has an opening 77 of substantial length along its front outer end portion and with an opening 78 along its rear side adjacent the inner end of the housing. The forward portion of the housing adjacent the opening 77 also is provided with a baffle or flared direction plate 79 to direct the earth into the opening 77 and into contact with the screw 69.

Upright bars 88 and 89 (see FIG. 5) are secured, respectively, on the side bar 48 and on the bifurcated end 55 and each of said upright bars has an opening in its upper end adapted to be brought into alignment when the debanker unit is in upright position and to receive a pin therethrough to prevent accidental falling of the unit.

In order to raise and lower the unit, a generally triangular connector 93 (see FIG. 5) is pivotally mounted by a bolt 94 at one corner to a lug 95 on the shaft housing 37. A chain 96 is connected at one end to an opening 97 in the connector 93 and the opposite end is adjustably connected by means of a threaded bolt and nut 98 through a bracket 99 on the housing for the implement. A third opening 100 is provided in the connector 93 in which is attached a cable 101 which extends over a pair of sheave wheels 102 and 103 mounted respectively on brackets 104 and 16 and connected to one of the hydraulic lift-arms 10′ of the tractor so that when the lift-arm is oscillated the bracket 93 will be rotated about its pivot member 94 and the fixed member 95 to cause tightening of the chain 96 and elevating the outer end of the unit after which the entire unit will be elevated.

The bracket 104 is provided with an upstanding arm 105, preferably L-shape or of other cross-section for strength, and having a top horizontal or shelf portion 106 with a lug 107 with an opening therethrough in which is received a threaded shank 108 with nuts on opposite sides of said shelf and adjustable therealong for securing said threaded shank in adjusted position. The lower end of the threaded shank 108 has attached thereto the horizontal portion of an L-shape bracket 109 having in its depending portion one or more openings 110 in which one or more coiled springs 111 are engaged. The lower ends of these springs engage openings in lugs carried by the bar 47 and the angle member 50 for resiliently supporting the same and the housing 37 and associated parts.

In view of the fact that the outer end of the cutter bar tends to overbalance the inner end, one or more balancing springs 112 are provided attached to shaft housing 37 by means of perforated plates 113 and with the other ends of the springs adapted to be disposed within the links of one or more chains welded to the implement housing. The tension on the springs can be varied by the engagement of the springs in the different links of the chain.

The bracket 104 is provided with an angular support 115 which attaches to the tractor rear axle housing in order to withstand the force of the elevating cable on the rear pulley.

In the operation of the device the tractor moves the debanker to a position such that the front opening 77 is substantially in alignment with the bank to be removed. As the tractor moves forward the screw engages the earth and transfers the same axially of the generally cylindrical housing and discharges such earth through the opening in the housing nearest to the tractor.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A debanker unit for removing a bank of earth and adapted to be driven by a tractor having a power take-off, said unit comprising an elongated, generally cylindrical housing having an inner end and an outer end, means at said inner end for attaching the unit to a tractor, said housing having an inlet opening of substantial length extending inwardly from the outer end thereof and facing forwardly to permit ready entry of earth thereinto and with the lower edge of the opening in a position to negage a bank of earth, a smaller discharge opening formed in the inner end of the housing, axially spaced from the inner end of the inlet opening and facing rearwardly in a general direction to discharge earth in a direction opposite to that from which the earth entered the housing, a generally spiral conveyor rotatable in and surrounded by the housing for transferring earth from the inlet through and along the housing axially to the discharge opening, said housing having means for supporting the unit close to the ground on which it moves and said conveyor having a shaft projecting from the inner end of the housing adapted to be driven by the power take-off of the tractor.

2. The srtucture of claim 1 in combination with a flared baffle plate at one end of the inlet opening to direct earth into said opening.

3. The structure of claim 1 wherein the means for supporting the unit close to the ground comprises an adjustable skid at each end of the housing and wherein there is a means for pivotally supporting the housing on the tractor so that said housing can follow the contour of the earth.

References Cited in the file of this patent

UNITED STATES PATENTS

| | | |
|---|---|---|
| 880,774 | Baty | Mar. 3, 1908 |
| 1,333,911 | Gibson | Mar. 16, 1920 |
| 1,480,652 | Burris | Jan. 15, 1924 |
| 2,148,568 | McBrady | Feb. 28, 1939 |
| 2,528,679 | Ballard et al. | Nov. 7, 1950 |
| 2,533,886 | Hill | Dec. 12, 1950 |
| 2,646,736 | Swartout | July 28, 1953 |
| 2,845,167 | Heiken | July 29, 1958 |
| 2,857,691 | Curran | Oct. 28, 1958 |
| 2,871,804 | Pounds et al. | Feb. 3, 1959 |